(12) United States Patent
Adams et al.

(10) Patent No.: US 8,997,639 B2
(45) Date of Patent: Apr. 7, 2015

(54) SMOKER BOX FOR HOLDING FOOD FLAVORING WOOD CHIPS OR THE LIKE

(75) Inventors: Charles Adams, Berkeley, CA (US); Cory Thomas Borovicka, San Francisco, CA (US)

(73) Assignee: Charcoal Companion Incorporated, Berkeley, CA (US)

( * ) Notice: Subject to any disclaimer, the term of this patent is extended or adjusted under 35 U.S.C. 154(b) by 641 days.

(21) Appl. No.: 12/699,807

(22) Filed: Feb. 3, 2010

(65) Prior Publication Data

US 2010/0218691 A1 Sep. 2, 2010

Related U.S. Application Data

(60) Provisional application No. 61/149,673, filed on Feb. 3, 2009.

(51) Int. Cl.
| A47J 9/00 | (2006.01) |
| A23B 4/03 | (2006.01) |
| A23B 4/044 | (2006.01) |
| A23B 4/052 | (2006.01) |
| A47J 37/07 | (2006.01) |

(52) U.S. Cl.
CPC .................. *A23B 4/044* (2013.01); *A23B 4/052* (2013.01); *A47J 37/0713* (2013.01); *A47J 37/0786* (2013.01)

(58) Field of Classification Search
CPC .............................. A23B 4/052; A47J 37/0786

USPC ..................... 99/482, 401, 446, 447
See application file for complete search history.

(56) References Cited

U.S. PATENT DOCUMENTS

| 57,890 | A | 9/1866 | Gilson |
| D91,023 | S | 7/1933 | Ellsworth |
| 3,199,765 | A | 8/1965 | Locke |
| 3,482,760 | A | 12/1969 | Pascus et al. |
| 4,770,157 | A * | 9/1988 | Shepherd et al. ........... 126/25 R |
| 5,042,657 | A | 8/1991 | Dunn |
| D346,256 | S | 4/1994 | Thomas, III et al. |
| 5,906,434 | A | 5/1999 | Berrios |
| D439,838 | S | 4/2001 | Sagel et al. |
| 6,926,196 | B2 | 8/2005 | Testerman et al. |
| D521,710 | S | 5/2006 | Goldschmidt |
| 7,219,830 | B2 | 5/2007 | West |
| D559,098 | S | 1/2008 | Wilbur |
| D572,973 | S | 7/2008 | Chau |
| 7,426,885 | B2 * | 9/2008 | McLemore et al. ............ 99/482 |
| D585,702 | S | 2/2009 | Borovicka et al. |
| 7,866,256 | B2 * | 1/2011 | Frigo ............................ 99/340 |
| 2002/0166460 | A1 * | 11/2002 | O'Shea .......................... 99/482 |
| 2004/0089163 | A1 * | 5/2004 | Elwedini ........................ 99/450 |
| 2010/0229896 | A1 * | 9/2010 | Bartelick ...................... 134/22.1 |

* cited by examiner

*Primary Examiner* — Reginald L Alexander
(74) *Attorney, Agent, or Firm* — Beeson Skinner Beverly, LLP

(57) ABSTRACT

A smoker box for a cooking grill is formed to fit between and be supported by adjacent parallel heat deflector bars of the cooking grill. The open top of the smoker box is preferably covered with a perforated lid that can be removably placed onto or hingedly connected to the top of the smoker box.

20 Claims, 6 Drawing Sheets

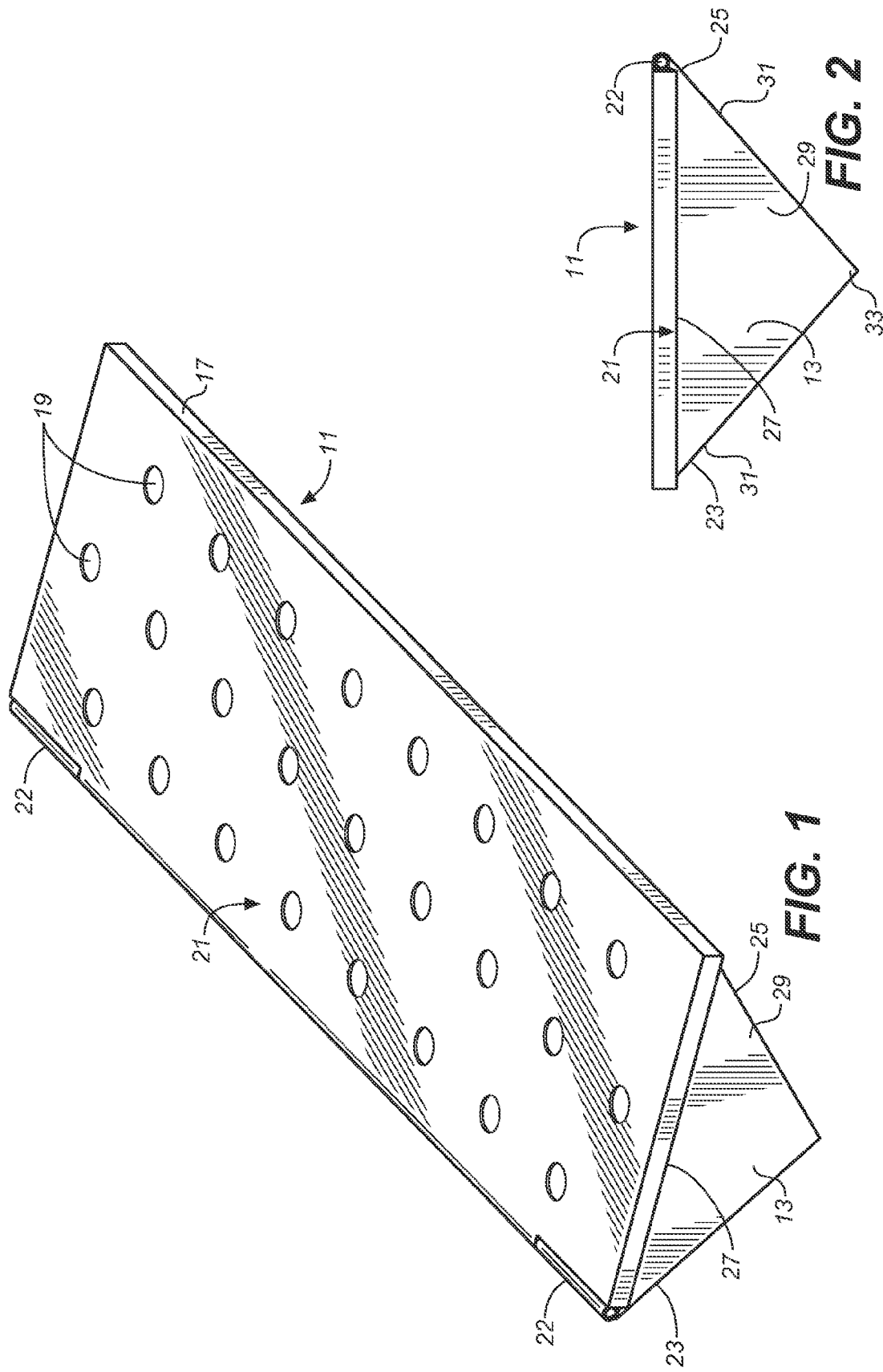

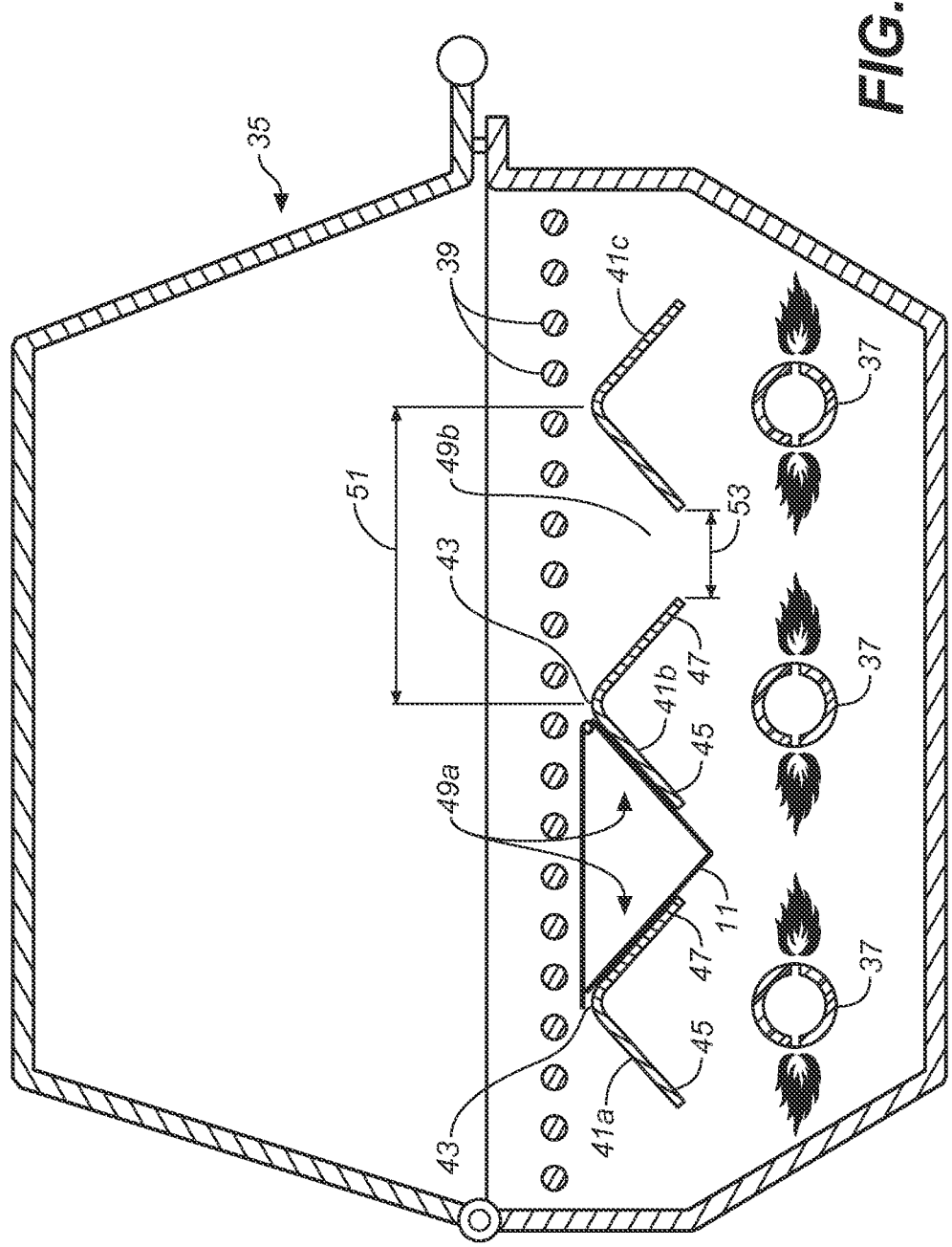

SMOKER BOX FOR HOLDING FOOD FLAVORING WOOD CHIPS OR THE LIKE

CROSS-REFERENCE TO RELATED APPLICATIONS

This application claims the benefit of U.S. provisional application No. 61/149,673 filed Feb. 3, 2009.

BACKGROUND

The present invention generally relates to the art of barbecuing, and more particularly to the use of wood chips or the like with a barbecue grill to enhance the flavor of barbecued foods.

It has long been known that the taste of barbecued food can be enhanced by exposing the food to smoke produced by heating wood chips or particulates, or the like. It is also known that more pronounced flavors can be obtained by first soaking the wood material in water, or other liquids, such as wine, beer, or whiskey, before exposing the wood material to heat. The soaking causes the wood material to smolder rather than burst into flames, thereby generating more smoke for flavoring the food. Various food flavoring effects of smoking can be achieved by using different types of wood. For example, heavy woods, like mesquite and pecan wood, have a stronger smoke flavor than fruit woods, such as apple and cherry.

Producing smoke-infused grilled foods is typically achieved in a charcoal grill by adding soaked wood chips or particulates directly to heated barbecue coals under the cooking grate upon which food is cooked. The smoke produced by the smoldering chips or particulates rises up through the grate and around the food supported thereby to efficiently smoke the food. However, for gas cooking grills, where there are no coals onto which soaked wood chips or particulates can be placed, smoking food becomes more of a challenge. For gas grills, smoker boxes or trays for wood chips have heretofore been placed on the cooking grate or built into the gas grill. In one known gas grill, a smoker special is provided that sets into an opening at the side of the cooking grate above a burner that is dedicated to heating the smoker box.

The drawback of prior art smoker box arrangements for gas grills is that the smoker box is not located where it can most advantageously smoke the food: directly below the cooking grate with the food being cooked thereon. Indeed, smoke produced from a smoker box set on top of the cooking grate is often ineffective in imparting any flavoring to the food, because the smoke is not circulated around the food. The ability to place smoker boxes at an advantageous position below the grate is inhibited by the fact that there is little space to do so. Gas grills typically include a series of burner tubes covered by heat deflector bars typically having an inverted V-shape, all of which are positioned just below the cooking grate. Modern gas grills are typically designed so that the burners and deflectors are as close to the cooking grate as practicable to maximize the heat at the cooking grate, leaving no space for a smoker box.

The present invention overcomes the drawbacks of conventional approaches to smoking foods cooked on gas grills by providing an improved smoker box capable holding an adequate quantity of soaked wood chips or particulate and yet capable of placement within the limited space between the cooking grate and heat deflector bars, so the smoker box emits smoke from a position immediately below food placed on the cooking grate.

DESCRIPTION OF THE DRAWINGS

FIG. 1 is a top perspective view of a smoker box in accordance with the invention.

FIG. 2 is an end elevational view thereof.

FIG. 3 is a graphical depiction of a gas grill showing a smoker box, such as illustrated in FIGS. 1 and 2, set between two heat deflector bars.

DETAILED DESCRIPTION OF THE ILLUSTRATED EMBODIMENTS

Figure 4A:
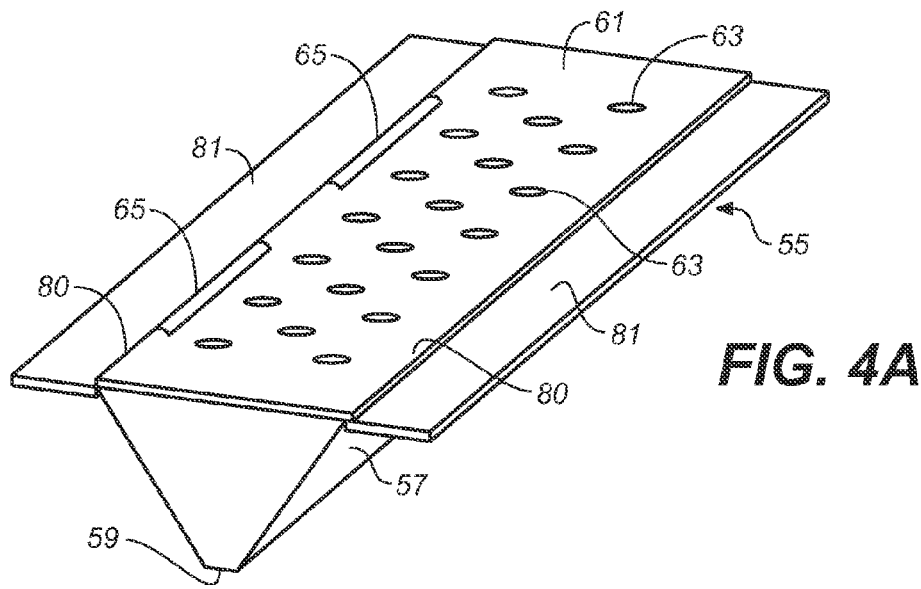
FIG. 4A-4C show alternative embodiments of a smoker box in accordance with the invention, each of which is provided with wing support extensions for supporting the smoker box on adjacent heat deflector bars of a gas grill.

The present invention is directed to a smoker box that can be easily and removably placed below the cooking grate of a gas or electric cooking grill having heat deflector bars. The smoker box is shaped so that it can be inserted and allowed to rest between adjacent heat deflector bars of the cooking grill, while providing sufficient volume for holding a quantity of wood chips. The smoker box also provides a relatively large top to allow smoke to be emitted from below the grate of the gas grill over a suitably broad area.

Referring to the embodiment illustrated in FIGS. 1 and 2, the smoker box, denoted by the numeral 11, is comprised of a container body 13 for holding a quantity of food-flavoring wood material, such as wood chips, and a lid 17 having a plurality of openings 19 and covering the top 21 of the container body. Preferably, the perforations in the lid are distributed evenly over the lid, however, a non-uniform perforations pattern would be possible and considered within the scope of the invention. The lid may be a separate part that is freely removable from the top of the container body, or it may be attached to one of the longitudinal edges of the container such as by hinges 22, so that the lid, which is shown in the closed position, can be pivoted to an open position for filling and emptying the smoker box.

In the illustrated embodiment, the lid 17 is shaped and sized to cover the entire top opening of the container body and provides an extended horizontal surface through which smoke generated by smoldering wood chips held in the container can be emitted. As later described, the lid could be sized and shaped to cover only a portion of the top opening. It will also be understood that a smoker box without a lid is within the scope of the invention. (See description of embodiment shown in FIG. 8.)

The container body of the smoker box illustrated in FIGS. 1 and 2 is somewhat elongated and has a rectangular top opening defined by opposing longitudinal edges 23, 25 and transverse edges 27 of end walls 29. Opposing sidewall structures in the form of straight sidewalls 31 extend downwardly from the longitudinal edges 23, 25 to meet at a point at the bottom 33 of the container body. In this illustrated configuration, it is seen that the container body has a triangular shape. However, as later described, the container body can have other shapes, provided the opposing sidewall structures of the container body progressively extend inward so that the bottom of the container body is relatively narrow as compared to the top of the container. This progressively narrowing characteristic substantially centers the bottom 33 of the container body, and thus the deepest portion of the container body, between longitudinal edges 23, 25, and allows the smoker box to fit between and be supported by the cooking grill's heat deflector bars.

FIG. 3 graphically illustrates how the smoker box illustrated in FIGS. 1 and 2 is used with a gas grill having heat deflector bars used to direct heat towards the cooking grate. (Similar heat deflector bars can be found in electric grills.) In FIG. 3, the illustrated gas cooking grill 35 is seen to have a heat source in the form of parallel gas burners 37, a cooking grate 39 above the burners, and parallel heat deflector bars 41a, 41b, 41c positioned above the gas burners between the burners and the grate. Each heat deflector bar has an apex 43 and walls 45, 47 that spread downwardly away from the apex. The spread walls of the heat deflector bars are seen to form a series of trough regions 49a, 49b between adjacent bars. For example, trough 49a is formed by the spread wall 47 of deflector bar 49a and the spread wall 45 of adjacent deflector bar 49b. Each trough region has a wide top 51 at the apex of the adjacent heat deflector bars, and a narrow bottom 53 where adjacent spread walls approach each other. The opening at the narrow bottom of the trough region is seen to be smaller than the maximum width of the smoker box as defined by the smoker box's top longitudinal edges 23, 25. Thus, when placed in this trough region, the smoker box 11 will be supported by the deflector bars. The smoker box will also drop down between the deflector bars so that it fits beneath the cooking grate 39. Preferably, the width at the top of the smoker box as defined by longitudinal edges 23, 25 of the container body 13 is chosen such that the top of the smoker box approximately spans the distance between the tops 43 of the heat deflector bars. This will maximize the surface area of the lid through which smoke is released. The smoker box is further preferably sized and shaped to approximately conform to the trough region between the deflector bars to maximize its volume. However, it is contemplated that the size of the smoker box relative to the trough region could be reduced and that the smoker box could be sized to allow it to drop further down between the deflector bars, so long as the width of the smoker box is sufficient to allow it to be retained by the deflector bars.

Figure 4B:
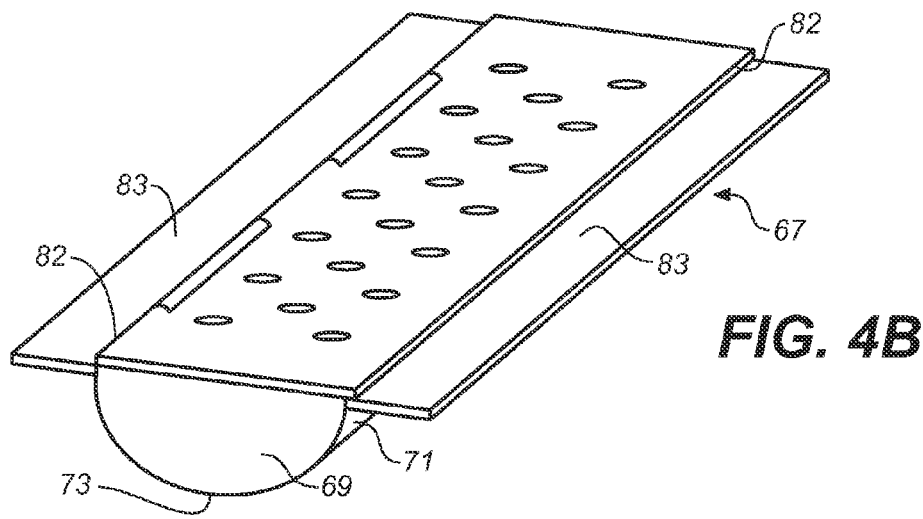
Figure 4C:
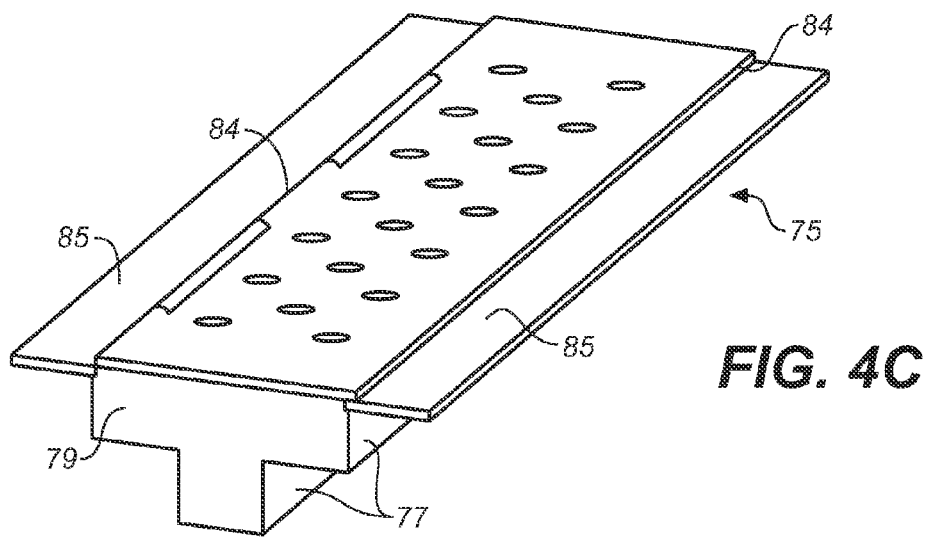

Examples of alternative configurations for the smoker box are shown in FIGS. 4A-4B. Referring to FIG. 4A, the smoker box 55 has a container body 57 with a generally triangular shape as shown in FIGS. 1 and 2, wherein the bottom 59 of the triangle is truncated to provide a flat bottom. A lid 61 with lid openings or perforations 63 is shown as being hinged to the container body by hinges 65, however, the lid does not need to be hinged and could be completely removable. In FIG. 4B, smoker box 67 has a differently shaped container body 69 with sidewalls 71 that curve inwardly toward the bottom 73 of the container body, resulting in a container body having a semi-cylindrical shape. In FIG. 4C, the sidewall structure 77 of the container body 79 of smoker box 75 is seen to have an inwardly stepped configuration. It is seen that in each of these alternative embodiments, wing support structures 81, 83, 85 extend outwardly from the top longitudinal edges 80, 82, 84 of the container body of each smoker box. The wing support structures, shown here as flat plates, provide an alternative means of supporting the smoker box on the grill's heat deflector bars.

Figure 5A:
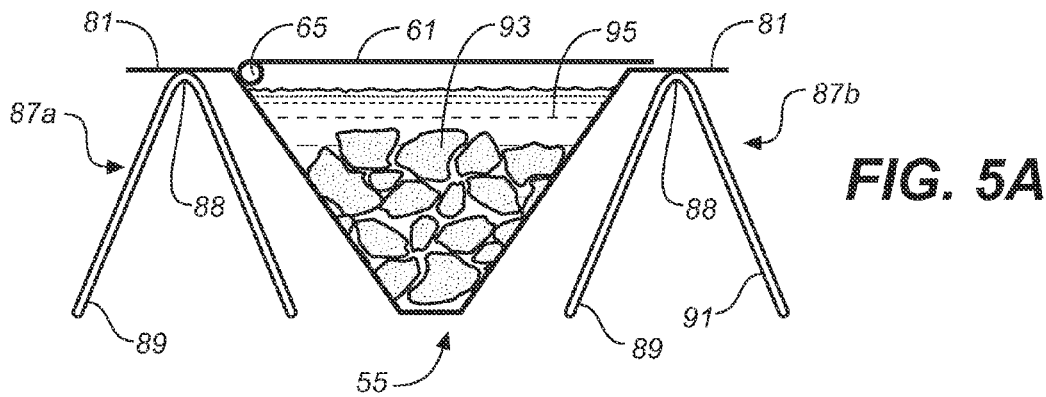
FIG. 5A-5C show the smoker boxes illustrated in FIGS. 4A-4C supported between adjacent heat deflector bars of a gas grill.
Figure 5B:
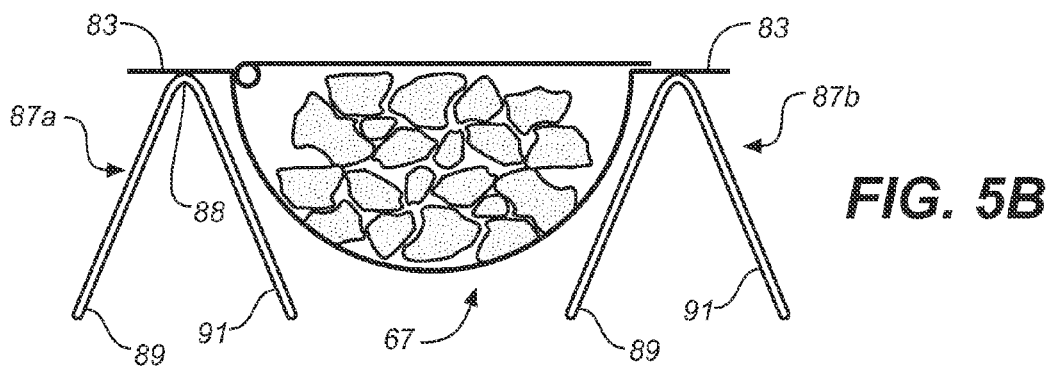
Figure 5C:
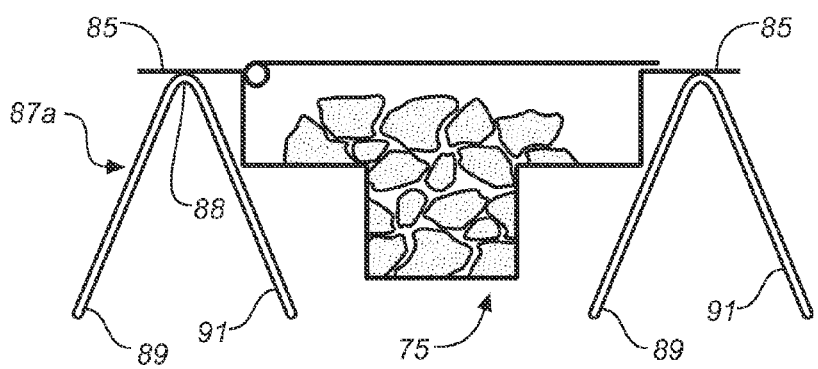

More specifically, it can be seen in FIGS. 5A-5C that the smoker boxes 55, 67, 75, instead of resting against the sidewalls 89, 91 of adjacent heat deflector bars 87a and 87b, hang on the tops or apexes 88 of the deflector bars by means of the wing support structures 81, 83, 85. The wing support structures, which are long enough to extend over the tops of the deflector bars, keep the smoker boxes elevated relative to the cooking grate (not shown in FIGS. 5A-5C) and provide a gripping structure that allows the user to easily insert and remove the smoker boxes.

It is noted that for illustrative purposes, a quantity of wood chips is shown in each of the smoker boxes shown in FIGS. 5A-5C. In FIG. 5A, the wood chips 93 are additionally shown immersed in a flavoring liquid 95. It is further noted that the container body of each smoker box shown in these figures, as well as in other figures, are elongated, that is they are longer than they are wide. It is contemplated that the that a container body of any length could be used, including a short length comparable to the width of the container body, so long as the smoker box fits between the heat deflector bars of a standard sized cooking grill. The longer the smoker box the greater its volume for holding greater quantity of wood chips.

Figure 6A:
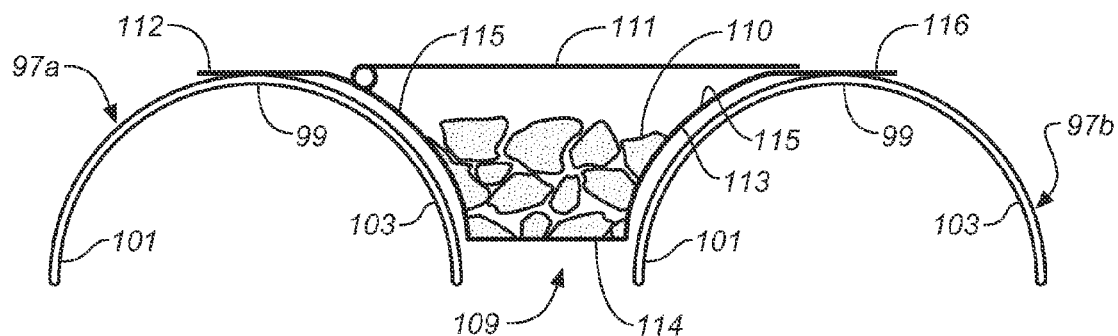
FIGS. 6A and 6B show further alternative embodiments of a smoker box in accordance with the invention.
Figure 6B:
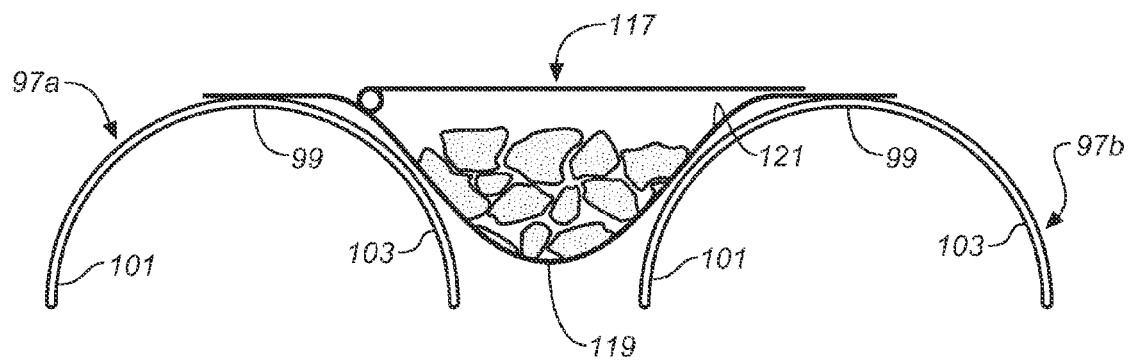

FIGS. 6A and 6B show yet further alternative designs for a smoker box in accordance with the invention adapted for use in a cooking grill having differently shaped heat deflector bars. In this case, heat deflector bars, denoted 97a, 97b, have a semi-cylindrical shape formed by curved sidewalls 101, 103 extending down from the tops or apexes 99 of the deflector bars. In FIG. 6A, the smoker box 109, shown with a hinged lid 111 and filled with wood chips 110, has a container body 113 with a truncated flat bottom 114 and concave sidewalls 115 that conform to the curvature of the downwardly extending sides 103, 105 of the adjacent deflector bars 97a, 97b. The sidewalls of the container body have lateral extensions that form wing support structures 112, 116 that extend over the tops 99 of the adjacent heat deflector bars for additional support. FIG. 6B illustrates a variation of the smoker box shown in FIG. 6A, wherein the bottom 119 of the container body of smoker box 117 is rounded instead of flat. In this example, the curved sidewalls 121 of the container body do not conform as closely to the curvature of the deflector bars and will have less volume. They do, however, include similar wing support extensions 123, 125 that extend over the tops of the deflector bars.

Figure 7:
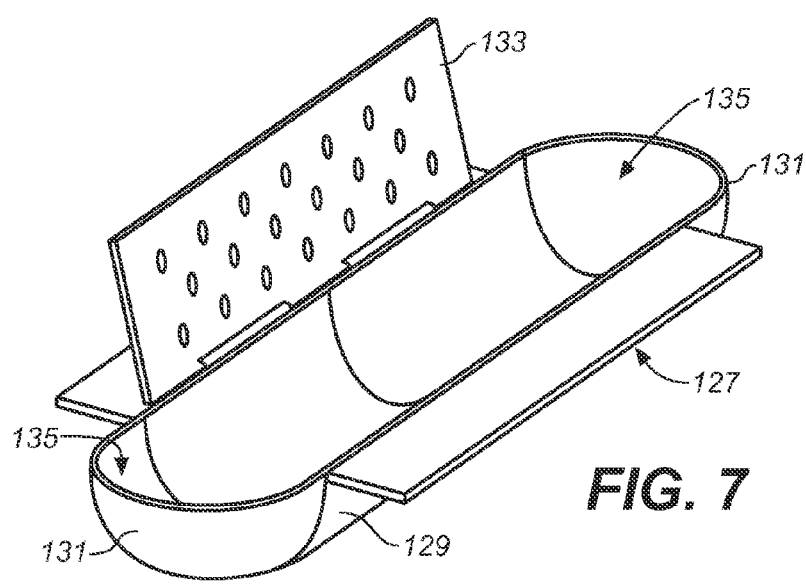
FIG. 7 is a top perspective view of yet another alternate embodiment of a smoker box according to the invention.

FIG. 7 shows yet another embodiment of a smoker box in accordance with the invention, wherein the container body 129 of smoker box 127 has cup-shaped extended ends 131 that extend beyond the perforated hinged lid 133 of the smoker box. In this embodiment, the top of the container body will remain open at the extended ends (as denoted by numerals 135) when lid 133 is closed. These open ends will allow wood chips or the like to be added to the smoker box when the lid is closed.

Figure 8:
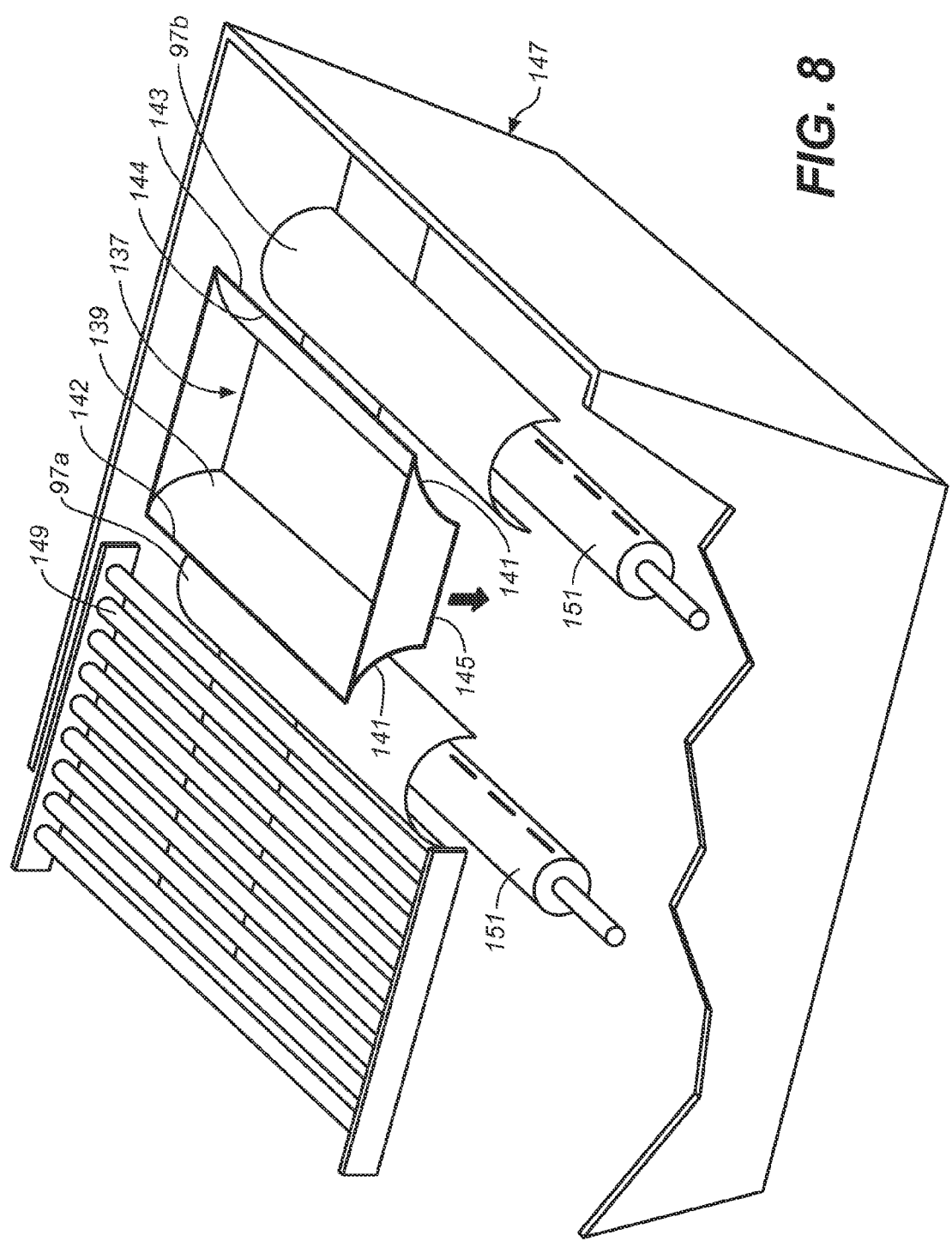
FIG. 8 is a graphical depiction of a smoker box in accordance with the invention being set into a gas grill so that it rests on adjacent heat deflector bars of the grill.

FIG. 8 graphically illustrates a smoker box, denoted by the numeral 137, being set into a gas cooking grill 147 having a cooking grate 149, burners 151, and semi-cylindrical deflector bars 97a, 97b, such as shown in FIGS. 6A and 6B. In this embodiment, the smoker box has no lid or wing supports, but an open container body 139 with inwardly curved side walls 141 that conform to the curvature of the deflector bars. This results in a smoker box having a large open top 143 having a width defined by the box's top longitudinal edges 142, 144. The width of the open top is seen to be greater than the width of the container body's truncated flat bottom 145. The transverse dimensions of the container body are selected so that curved sidewalls 141 mate with the curved heat deflector bars when the smoker box is in place.

The smoker boxes described herein can be suitably fabricated of a sheet metal material, such as stainless sheet steel, using well known fabrication methods; however, it will be appreciated that other heat tolerant materials could be used.

In using the smoker box described herein, wood chips or the like, preferably soaked in water or a flavoring liquid, can be placed in the container body of the smoker box before or after the smoker box is placed on the grill's heat deflector bars. After placing the lid over the top opening of the container body, the smoker box is set into the trough region between adjacent heat deflector bars of the cooking grill, such that the smoker box is supported by the heat deflector bars. Once the smoker box is in place, the cooking grate can be put into place over the heat deflector bars and the cooking grill turned on for cooking. Food to be smoked is suitably placed on the grill immediately over or very near the smoker box. It will be understood that more than one smoker box in accordance with the invention could be placed between the grill's heat deflector bars to increase the amount of smoke available during the cooking process. The smoke generated within the smoking box or boxes of the invention used as above-described will be released beneath and close to the food being grilled, and thus will be effective in flavoring the food.

While the present invention has been described in considerable detail in the foregoing specification and accompanying drawings, it is not intended that the invention be limited to such detail, except as necessitated by the following claims.

What we claim is:

1. A smoker box for holding food flavoring wood chips or the like and for use with a cooking grill having burners, a removable cooking grate above the burners, and parallel heat deflector bars between the burners and the cooking grate, and wherein the heat deflector bars have an apex and deflector spread walls that spread down and away from the apex whereby adjacent spread walls of adjacent heat deflector bars form a trough region between adjacent heat deflector bars, said trough region having a top at the apex of the adjacent heat deflector bars and a bottom, wherein the trough region progressively narrows from the top to the bottom thereof, said smoker box comprising:
    an at least partially open top having top longitudinal edges defining the maximum width of the smoker box, said maximum width being wider than the bottom of the trough region of adjacent heat deflector bars of a cooking grill on which the smoker box is used, and
    side wall structures extending downwardly and progressively inwardly from said top longitudinal edges to form a container body for holding wood chips or the like, wherein said container body is sized and shaped to fit substantially entirely within the trough region between adjacent heat deflector bars of a cooking grill on which the smoker box is used, whereby, when the smoker box is placed bottom down between adjacent heat deflector bars of the cooking grill, the smoker box sits between and is supported by said adjacent heat deflector bars and presents a relatively large area top that faces food placed on a cooking grate above the smoker box,
    said container body having a bottom centered between the longitudinal edges of the open top of the container body, wherein said bottom defines the deepest portion of the container body, and wherein the downwardly extending sidewalls of the container body extend progressively inwardly to the centered bottom of the container body.

2. The smoker box of claim 1 wherein said sidewall structures are comprised of straight sidewalls extending downwardly and inwardly from said top longitudinal edges to form a generally V-shaped container body.

3. The smoker box of claim 1 wherein said sidewall structures are comprised of inwardly stepped sidewalls extending downwardly from said top longitudinal edges to form an inwardly stepped container body.

4. The smoker box of claim 1 wherein said sidewall structures are comprised of downwardly curved sidewalls.

5. The smoker box of claim 4 wherein said curved sidewalls provide a container body having a substantially hemispherical shape.

6. The smoker box of claim 1 further comprising a lid covering the top of the smoker box, said lid having at least one opening for allowing smoke from wood chips or the like contained within the container body of the smoker box to be released from the smoker box to flavor food on a cooking grate above the smoker box.

7. The smoker box of claim 6 wherein said lid has a plurality of openings to allow smoke to be released over a relatively large portion of the lid.

8. The smoker box of claim 7 wherein said openings are evenly distributed over said lid for evenly distributing smoke released from said smoker box to food supported on a cooking grate above the smoker box.

9. The smoker box of claim 6 wherein said lid covers a portion of the open top of the smoker box, and wherein a portion of the open top remains open for adding wood chips when the lid is closed.

10. The smoker box of claim 6 wherein said lid is hinged to one of the longitudinal edges of said smoker box.

11. The smoker box of claim 1 further comprising wing support structures extending outwardly from said top longitudinal edges, whereby said wing support structures can rest on the apexes of adjacent heat deflector bars of a cooking grill.

12. The smoker box of claim 11 wherein said wing support structures are substantially flat plates extending laterally from the top longitudinal edges of the smoker box.

13. A smoker box for holding food flavoring wood chips or the like and for use with a cooking grill having burners, a removable cooking grate above the burners, and parallel heat deflector bars between the burners and the cooking grate wherein the heat deflector bars have an apex and deflector spread walls that spread down and away from the apex, whereby adjacent spread walls of adjacent heat deflector bars form a trough region between adjacent heat deflector bars, said trough region having a top at the apex of the adjacent heat deflector bars and a bottom, wherein the trough region progressively narrows from the top to the bottom thereof, said smoker box comprising:
    an elongated container body having an elongated top having a defined width and a top opening, and an elongated bottom that is narrower than the width of the top, the width of the top of the container body being larger than the width of the bottom of the trough region between adjacent heat deflector bars of a cooking grill on which the smoker box is used, whereby the smoker box can be supported by the heat deflector bars when placed between the heat deflector bars, said elongated container body being sized and shaped to fit substantially entirely within the trough region between adjacent heat deflector bars of the cooking grill, and the elongated bottom of said container body being centered beneath the top opening of the container body and defining the deepest portion of the container body, and
    a lid for at least partially covering the top opening of said container body, said lid having a plurality of openings to allow smoke to be released over a relatively large area of the lid, whereby smoke from wood chips or the like contained within the container body of the smoker box is released from the smoker box to flavor food on a cooking grate above the smoker box.

14. The smoker box of claim 13 wherein the width of the top of the container body is selected to be comparable to the distance between the apexes of adjacent heat deflector bars of the cooking grill on which the smoker box is used so that the top opening of the smoker box approximately spans the heat deflector bars.

15. The smoker box of claim 13 wherein said elongated container body has a generally triangular shape.

16. The smoker box of claim 13 wherein said elongated container body has a generally semi-cylindrical shape.

17. The smoker box of claim 13 wherein said container body has inwardly stepped sidewalls.

18. A smoker box for holding food flavoring wood chips or the like and for use with a cooking grill having burners, a removable cooking grate above the burners, and parallel heat deflector bars between the burners and the cooking grate wherein the heat deflector bars have an apex and deflector spread walls that spread down and away from the apex whereby adjacent spread walls of adjacent heat deflector bars form a trough region between adjacent heat deflector bars, said trough region having a top at the apex of the adjacent heat deflector bars and a bottom, wherein the trough region progressively narrows from the top to the bottom thereof, said smoker box comprising:

a container body for holding wood chips or the like, said container body having a top and a smaller bottom centered beneath said top which defines the deepest portion of the container body, wherein the container body progressively narrows from said top to said smaller centered bottom, said container body being sized and shaped to approximately conform to the trough region between adjacent heat deflector bars of the cooking grill on which the smoker box is to be used, and a lid for at least partially covering the top of the smoker box, said lid having a plurality of openings to allow smoke to be released over a relatively large area of the lid, whereby smoke from wood chips or the like contained within the container body of the smoker box is released from the smoker box to flavor food on a cooking grate above the smoker box.

19. The smoker box of claim 18 wherein said container body has a top and is formed such that its maximum width is at said top.

20. The smoker box of claim 19 wherein said container body is sized such that, when placed in the trough region between deflector bars of the cooking grill, the top thereof will be elevated to approximately the position of the apexes of the heat deflector bars supporting the smoker box.

* * * * *